United States Patent [19]
Simon et al.

[11] Patent Number: 6,158,906
[45] Date of Patent: Dec. 12, 2000

[54] DEVICE TO ID PHOTOGRAPHS

[76] Inventors: Gloria Gaynor Simon; Linwood M. Simon, both of 250 Gorge Rd., Cliffside Park, N.J. 07010

[21] Appl. No.: 09/411,377

[22] Filed: Oct. 4, 1999

Related U.S. Application Data

[60] Provisional application No. 60/111,808, Dec. 11, 1998.

[51] Int. Cl.[7] ............................................. B41J 3/36
[52] U.S. Cl. ............................................. 400/88; 400/103
[58] Field of Search ..................... 400/88, 103, 615.2; 361/679; 364/708.1, 709.01, 709.06, 709.12, 709.13, 709.16

[56] References Cited

U.S. PATENT DOCUMENTS

| | | | |
|---|---|---|---|
| D. 359,753 | 6/1995 | Salinas et al. | 101/76 |
| D. 365,360 | 12/1995 | Lore | 400/690.1 X |
| 4,736,536 | 4/1988 | Doman | 40/158 R |
| 5,032,030 | 7/1991 | Russbult | 400/88 |
| 5,188,464 | 2/1993 | Aaron | 400/103 |
| 5,233,547 | 8/1993 | Kapp et al. | 364/705.02 |
| 5,593,236 | 1/1997 | Bobry | 400/88 |
| 5,634,730 | 6/1997 | Bobry | 400/88 |
| 5,748,511 | 5/1998 | Mansutti et al. | 364/708.1 |

FOREIGN PATENT DOCUMENTS 2037665  7/1980  United Kingdom.

OTHER PUBLICATIONS

LabelScape; WWW.HAWKLABELING.COM/LBLSCP.HTM.

*Primary Examiner*—John S. Hilten
*Assistant Examiner*—Minh Chau
*Attorney, Agent, or Firm*—Richard C. Litman

[57] ABSTRACT

A manually portable, battery operated, electronic device for inscribing data on the back of a photograph. The inscribed data includes indicia (name, location, date, occasion) necessary to properly identify the photograph at a later time. The device incorporates a keyboard, a screen for previewing data to be inscribed, and a printer mechanism all controlled by electronic circuitry. The device is adapted to inscribe photographs of all sizes.

10 Claims, 2 Drawing Sheets

DEVICE TO ID PHOTOGRAPHS

CROSS-REFERENCE TO RELATED APPLICATION

This application claims the benefit of U.S. Provisional Patent Application Serial No. 60/111,808, filed Dec. 11, 1998.

BACKGROUND OF THE INVENTION

1. Field of the Invention

The present invention generally relates to an apparatus for printing. More specifically, the present invention is drawn to a device for printing information on the backs of photographs.

2. Description of Related Art

Photographs are like windows to the past in that they portray faces and events that often invoke fond memories. Many times however, the photographs are relatively old and one'fading memory will not permit the viewed faces and/or events to be identified with desired certainty. At such times a photograph inscribed with a name, date, and/or place would be an invaluable aid in jogging the memory to recall the specifics of the pictured occasion. The laborious process of inscribing data on photographs by writing is often ineffective in that the writing fades over time and becomes illegible. A device for conveniently and directly labeling a photograph would be an ideal solution.

A typical prior art device for directly labeling photographs is disclosed in U.S. Pat. No. 5,032,030 (Russbult). However, the invention of the '030 patent does not incorporate a current date and time entry.

U.S. Pat. No. Des. 359,753 (Salinas et al.), U.S. Pat. No. 4,736,536 (Dorman), and the LabelScape reference (LS-180) disclose label-making devices, which devices lack the capability to directly apply data to photographs.

U.S. Pat. No. 5,188,464 (Aaron), U.S. Pat. No. 5,593,236 (Bobry) and U.S. Pat No. 5,634,730 (Bobry) show printing devices. There appears to be no disclosure in these patents enabling printing of specific data on photographs.

Other patents less relevant to the intended purpose of the present invention include U.S. Pat. No. Des. 365,360 (Lore), which is drawn to an addressing and mailing machine, and, British Patent number 2,037,665 A which discloses a check writing device.

None of the above inventions and patents, taken either singly or in combination, is seen to disclose a device to ID photographs as will be subsequently described and claimed in the instant invention.

SUMMARY OF THE INVENTION

The present invention is a battery-operated, portable, user friendly device for directly inscribing data on the back of any size photograph. The device comprises a "QWERTY" type keyboard incorporated with a printing mechanism. A display screen is disposed above the keyboard for previewing the typed data to be inscribed on the photograph. A press bar is disposed below the keyboard, which press bar will function to activate the printing mechanism. A slot is positioned at the front of the device and is adapted to receive a photograph, typically of 5×7 inch dimensions or less.

The device utilizes known electronic circuitry to create and display four fields (name, date, location, and occasion) on the screen. The current date and time will also be displayed. The data typed to complete the fields as well as the current date and time will be imprinted on the back of the inserted photograph for future reference. Inclusion of the current date and time could become valuable as evidence in legal proceedings under certain circumstances.

Accordingly, it is a principal object of the invention to provide a novel device for inscribing data onto photographs.

It is another object of the invention to provide a novel device for inscribing data onto photographs, which device is portable.

It is a further object of the invention to provide a device for inscribing data onto photographs, which device is adapted to receive photographs of any size.

Still another object of the invention is to provide a device for inscribing data onto photographs, which device is attractive and easy to use.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
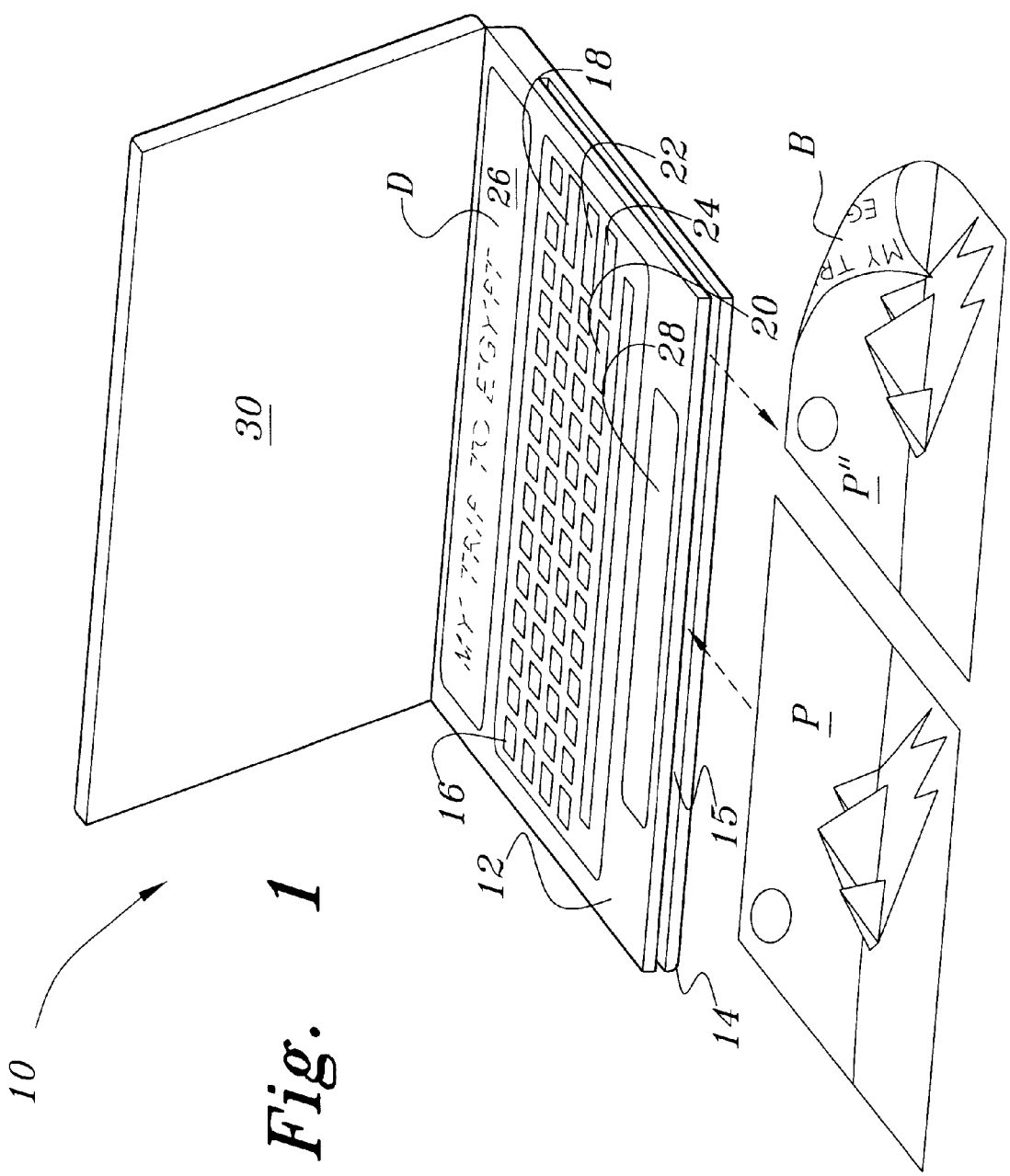
FIG. 1 is an environmental, perspective view of a device to identify photographs according to the present invention.
Figure 2:
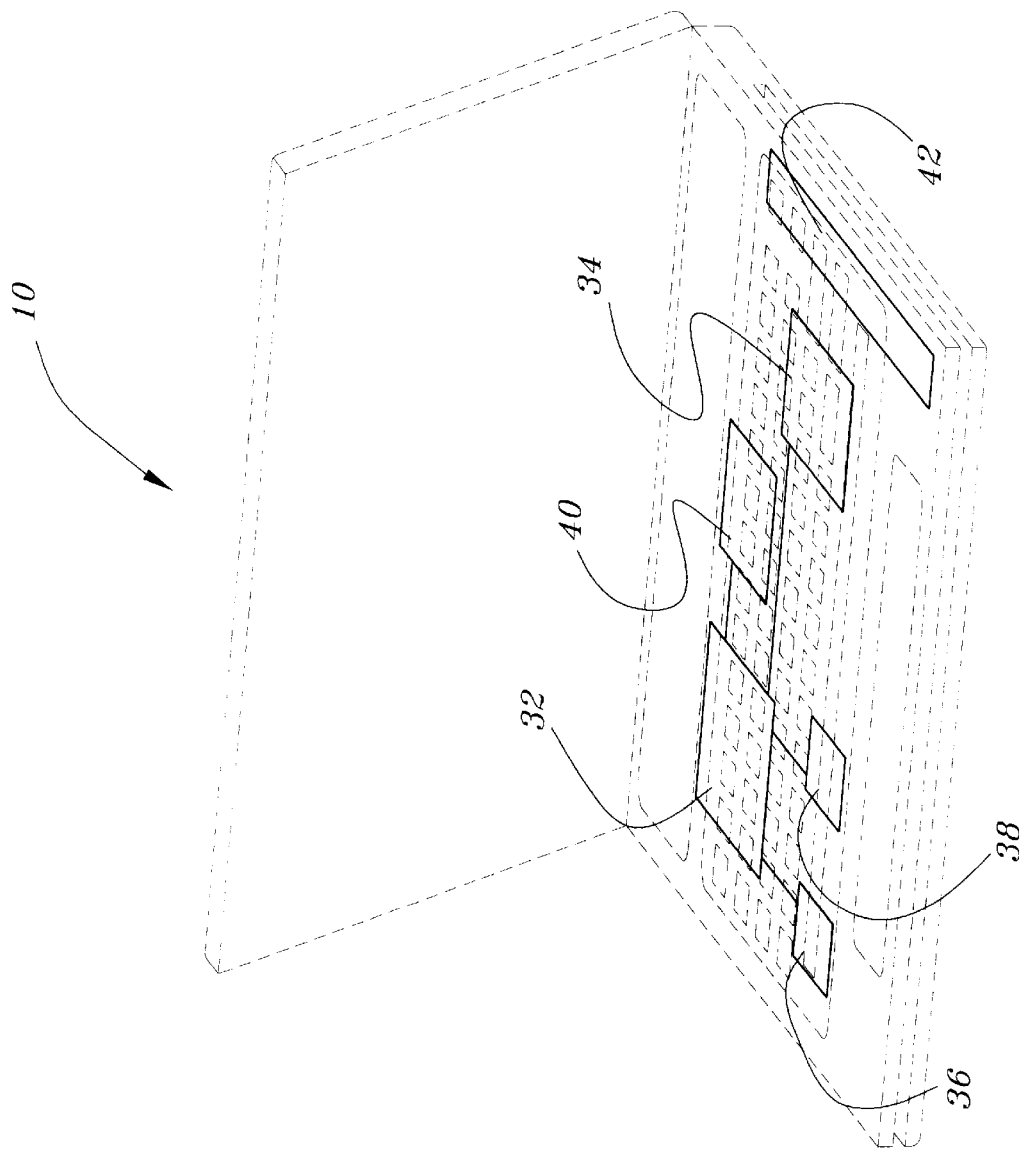
FIG. 2 is a sectional view showing a block diagram of electronic circuitry utilized according to the present invention.

The present invention as shown in FIGS. 1 and 2 comprises a generally rectangular hand-held device for imprinting the back side B of a photograph. The device generally shown at 10 has a housing made of hard plastic material. The measurements of the housing in inches are approximately 6.5×3.5×0.5.

To accommodate ease of printing on the photo, device 10 is fabricated to form identically-dimensioned top and bottom sections 12 and 14 respectively. Sections 12 and 14 are spaced apart at the front and sides so as to form a slot 15 for receiving a photograph P having an non-printed backside (not shown). Preferably, the dimensions of the slot 15 should accommodate standard photograph sizes, and subject to the overall dimensions of the housing, can therefor imprint substantially all or a large portion of the back side B of a 3×5 inch photo P with printing along the margins on photos of 5×7 inches and larger.

A keyboard 16 is disposed on top section 12. Keyboard 16 is of the "QWERTY" design including letters A–Z and numbers 0 through 9. The keyboard incorporates edit key 18, insert key 20, delete key 22, and a time/date set key 24, all of whose functions will be later explained. A display screen 26 is located above keyboard 16 for previewing typed data D. Bar 28 is positioned below keyboard 16. Bar 16 functions to activate a printing module 40 housed internally (FIG. 2) and having printing heads oriented into slot 15.

A thin cover 30 is hinged at the back of sections 12 and 14. As illustrated in FIG. 1, cover 30 is in an upright or open position thereby exposing keyboard 16 for use. It is obvious that cover 30 will provide protection for the keyboard when the cover is closed.

Basic circuitry requirements for the present invention are best seen in FIG. 2. A micro processor 32 receives signals from the keyboard via data input 34, clock 36, and calendar 38 modules. The received signals are converted into alpha-numeric characters and presented for viewing on display screen 26. A printer module 40 receives signals from the micro processor 32 for electronic or mechanical inscription of the alpha-numeric characters onto the back side B of the photo. The device is designed to be powered by battery 42, which may be accessed through an opening on the housing on the rear.

The invention functions in the following manner: Cover 30 is opened and the device is turned on by an on/off button or switch (not shown). The on/off switch may be incorporated in the cover for automatic operation if desired. When the device is on, time/date set key 24 is manipulated so that the current time and date are entered and displayed on screen 26. Data relating to the aforementioned fields are now typed and previewed on screen 26. If the previewed data D is incorrect, edit key 18, insert key 20, and delete key 22 may be utilized to amend the data.

When the previewed data has been entered and is correct as desired by the user, the selected photograph p is inserted into slot 15 so that the back B of the photograph abuts the printer heads of the printer heads associated with the printer module 40. Bar 28 is pressed causing a signal to be sent to the printer module 40 whereby the previewed data is inscribed by the proximate printer heads onto the back B of the photograph, as shown by photo P".

It is to be understood that the present invention is not limited to the sole embodiment described above, but encompasses any and all embodiments within the scope of the following claims.

We claim:

1. Apparatus for applying information to the back of a photograph, said apparatus comprising:
    a rectangularly shaped body, said body having a top section;
    a bottom section configured identically to said top section and spaced therefrom on three sides so as to form a continuous slot therebetween, said continuous slot receiving said photograph and allowing the photograph to extend out all three sides during application of information on the back of the photograph;
    a keyboard incorporated on said top section;
    display means positioned on said top section adjacent to said keyboard;
    means for electronically integrating said keyboard with said display means; and
    a movable lid hinged on said rectangularly shaped body for covering and uncovering said top section.

2. The apparatus of claim 1, wherein said means for electronically integrating includes a micro processor disposed within said rectangularly shaped body.

3. The apparatus of claim 2, wherein a printing device is disposed within said rectangularly shaped body and wherein said printing device is electronically integrated with said micro processor and a bar disposed on said keyboard for activating said printing device.

4. The apparatus of claim 3, wherein a data input module is disposed within said rectangularly shaped body, and wherein said data input module is electronically integrated with said micro processor whereby data typed from said keyboard can be viewed on said display means.

5. The apparatus of claim 4, wherein a battery is disposed within said electronically shaped body, and wherein said battery is electronically integrated with said micro processor to provide power thereto.

6. The apparatus of claim 5, wherein said key board includes an edit key.

7. The apparatus of claim 6, wherein said keyboard includes an insert key.

8. The apparatus of claim 7, wherein said keyboard includes a delete key.

9. The apparatus of claim 5, wherein a clock module is disposed within said rectangularly shaped body, and wherein said clock module is electronically integrated with said micro processor, whereby a correct time can be viewed on said display means.

10. The apparatus of claim 9, wherein a calendar module is disposed within said rectangularly shaped body, and wherein said calendar module is electronically integrated with said micro processor, whereby a correct date can be viewed on said display means.

* * * * *